United States Patent
Sato (10) Patent No.: US 6,603,228 B1
(45) Date of Patent: *Aug. 5, 2003

(54) DRIVING UNIT OF A WELDING EQUIPMENT

(75) Inventor: Yoshio Sato, Ayase (JP)

(73) Assignee: Obara Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/533,554

(22) Filed: Mar. 22, 2000

(30) Foreign Application Priority Data

Jun. 4, 1999 (JP) .......................... 11-157724
Jan. 6, 2000 (JP) ........................ 2000-000744

(51) Int. Cl.⁷ .................. H02K 7/06; H02K 41/00; H02K 33/00
(52) U.S. Cl. .................. 310/83; 310/12; 310/75 B; 310/15
(58) Field of Search .................. 310/75 R, 80, 310/69, 84, 77, 12, 13, 14, 15, 17, 19, 20, 21, 23, 83, 75 B; 228/45

(56) References Cited

U.S. PATENT DOCUMENTS

| | | | | |
|---|---|---|---|---|
| 564,437 A | * | 7/1896 | MacBeth ................... | 310/69 |
| 2,030,260 A | * | 2/1936 | Lewis ....................... | 310/90 |
| 4,689,509 A | * | 8/1987 | Kumatani et al. ......... | 310/77 |
| 4,751,411 A | * | 6/1988 | Fukaya et al. ............ | 310/83 |
| 5,041,748 A | * | 8/1991 | Huber ....................... | 310/80 |
| 5,099,161 A | * | 3/1992 | Wolfbauer, III .......... | 310/80 |
| 5,549,015 A | | 8/1996 | Aiso et al. ................ | 74/89.34 |
| 5,966,988 A | | 10/1999 | Aiso et al. ................ | 74/89.34 |
| 6,223,971 B1 | * | 5/2001 | Sato ......................... | 228/45 |

FOREIGN PATENT DOCUMENTS

| | | | | |
|---|---|---|---|---|
| CH | 555614 A | * | 10/1974 | ........... H02K/7/06 |
| DE | 2650953 A | * | 5/1977 | ........... H02K/7/06 |
| EP | 0 644 014 | | 3/1995 | |
| JP | 7-290251 | | 11/1995 | |
| JP | 07290251 | * | 11/1995 | |
| JP | 07290251 A | * | 11/1995 | ........... B23K/11/11 |
| JP | 09144834 | * | 6/1997 | |
| JP | 9-144834 | | 6/1997 | |
| JP | 3042268 | | 7/1997 | |
| JP | 11-197843 | | 7/1999 | |

* cited by examiner

Primary Examiner—Joseph Waks
Assistant Examiner—Guillermo Perez
(74) Attorney, Agent, or Firm—Flynn, Thiel, Boutell & Tanis, P.C.

(57) ABSTRACT

There is provided a driving unit of a welding equipment capable of reducing the size of the driving unit, of reducing the moment of inertia, and of being compact and having an excellent operability. The driving unit of a welding equipment provided with a pressure application shaft that is driven by a motor comprises a screw shaft provided integrally with or substantially integrally with a rotary shaft of the motor, a nut provided integrally with or substantially integrally with the pressure application shaft and is screwed with a screw of the screw shaft, and a baffling mechanism provided on the pressure application shaft, and wherein the rotary shaft of the motor is positioned substantially coaxially with the screw shaft and a rotary force outputted from the rotary shaft of the motor is converted into a reciprocating motion of the pressure application shaft.

9 Claims, 6 Drawing Sheets

DRIVING UNIT OF A WELDING EQUIPMENT

BACKGROUND OF THE INVENTION

1. Field of the Invention

The invention relates to a driving unit of a welding equipment capable of converting a rotary output of a motor into reciprocating motion of a pressure application shaft so that the pressure application shaft can operate a gun arm or a welding jig.

2. Related Art

There is a known driving unit of a welding equipment provided with a pressure application shaft to be driven by a motor as disclosed, for example, in Japanese Utility Model Registration No. 3042268 and Patent Laid-Open Publication No. 9-144834, wherein a screw shaft is provided on an output shaft extended from a motor by way of a gear and a screw provided on one end of the screw shaft is screwed with a nut formed on the pressure application shaft (hereinafter referred to as a first prior art).

There is a further known driving unit of a welding equipment provided with a pressure application shaft to be driven by a motor as disclosed, for example, in Japanese Patent Laid-Open Publication No. 7-290251, wherein a rotary shaft of a motor is made hollow and a screw shaft is forced to penetrate this hollow portion so that a screw formed on the screw shaft is screwed with a nut fixed to the rotary shaft (hereinafter referred to as a second prior art).

However, in the first prior art, since the screw shaft is provided on the output shaft extended from the motor by way of a gear, a driving unit becomes complex and it becomes long in its entire length, resulting in a drawback of unstable operation when operating a motor-operated welding equipment.

In the second prior art, although the length of the driving unit becomes long, the diameter of the motor becomes large because the nut is fixed to the rotary shaft of the motor inside the motor and also the moment of inertia becomes large because the diameter of the nut is relatively larger than the screw of the screw shaft, thereby extending the acceleration and declaration time of electrodes when the electrodes open and close as the motor operates.

SUMMARY OF THE INVENTION

The invention has been made in view of the problems of the conventional driving unit of a welding equipment, and it is a first object of the invention to provide a driving unit of a welding equipment capable of reducing the size of the driving unit and reducing the moment of inertia by integrating or substantially integrating a rotary shaft of a motor and a screw shaft so that the driving unit of a welding equipment has an excellent operability.

It is a second object of the invention to provide a driving unit of a welding equipment capable of easily fixing a screw shaft to a rotary shaft by use of fixed means utilizing a friction force without requiring a troublesome operation such as shrinkage fit or cold shrinkage fit.

It is a third object of the invention to provide a driving unit of a welding equipment capable of securing the application of pressure to a workpiece by a pressure application shaft by disposing an elastic body on the axis of the pressure application shaft through which pressure application force exerts.

It is a fourth object of the invention to provide a driving unit of a welding equipment capable of moving a pressure application shaft to a desired standby position when a motor is troubled by forming a machining part for manually turning the screw shaft at the rear end side of the rotary shaft or screw shaft.

PREFERRED EMBODIMENT OF THE INVENTION

First Embodiment (FIG. 1):

A driving unit of a welding equipment according to a first embodiment is described next.

Figure 1:
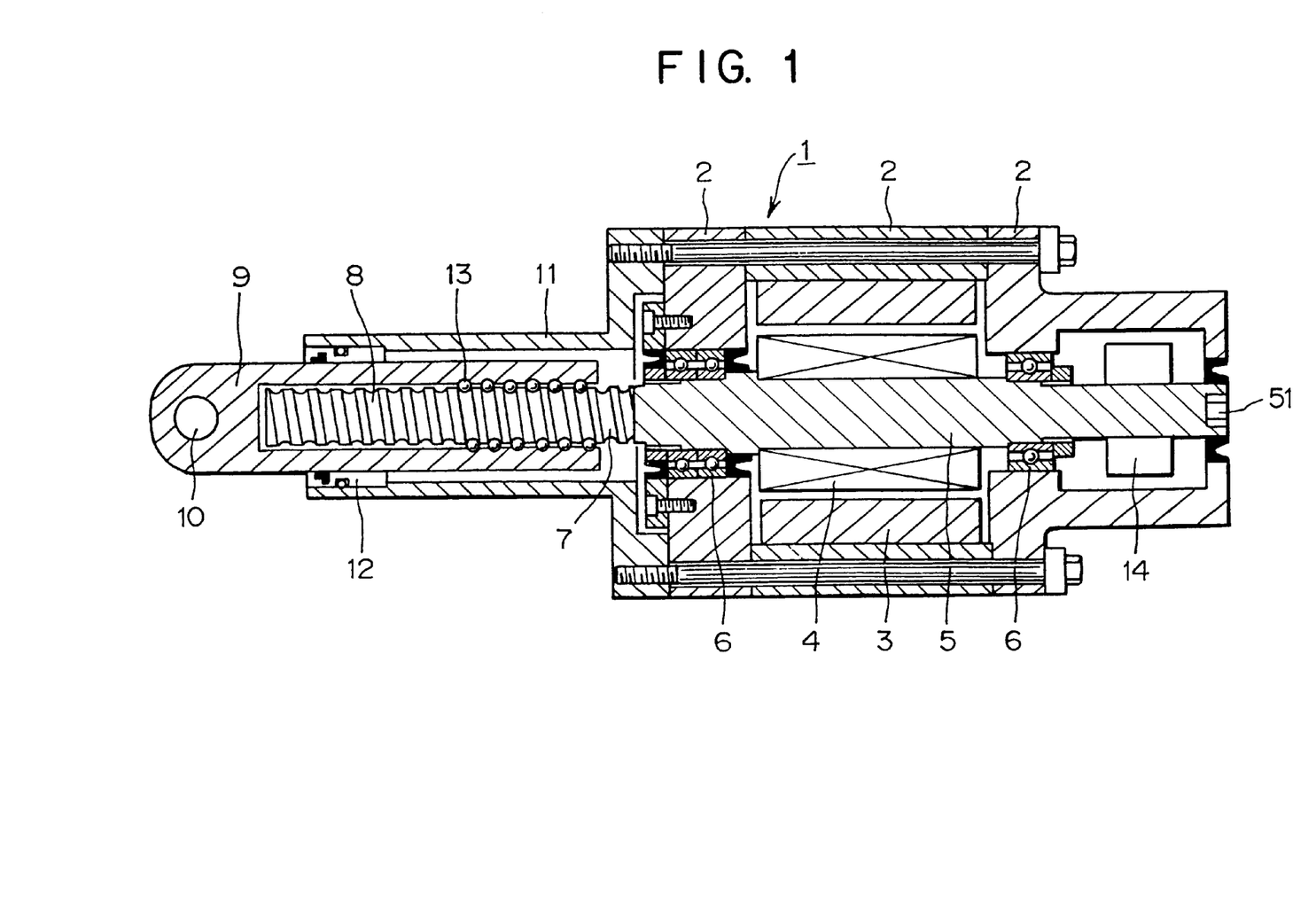
FIG. 1 is a sectional view of a driving unit of a welding equipment according to a first embodiment of the invention.

In FIG. 1, a servomotor 1 comprises a winding 3 of a stator that is fixed to an outer shell 2, a rotor magnetic pole 4 disposed at the inner periphery of the winding 3, and a rotary shaft 5 to which the rotor magnetic pole 4 is fixed, wherein the rotary shaft 5 is journaled by bearings 6 and supported by the outer shell 2 of the servomotor. The rotary shaft 5 is extended toward its output direction and the extended portion constructs a screw shaft 7 on which a male screw 8 is provided to form a ball screw. A machining part 51 to which a manually operating handle is mounted is formed on the end of the rotary shaft 5 opposite to the output side of the rotary shaft 5.

A pressure application shaft 9 is connected, e.g., to a movable arm (not shown) or swingable arm (not shown) by way of a trunnion shaft 10, or, e.g., to a workpiece placing table (not shown) at the front end thereof. The pressure application shaft 9 is journaled by a bearing 12 inside a frame case 11 so as to be reciprocated but not turned. The pressure application shaft 9 is formed of a hollow shaft and has a female screw which is directly provided on the inner peripheral surface at the end thereof and meshes with the male screw 8, so as to form a ball nut 13. Accordingly, the ball nut 13 is integrally formed on the pressure application shaft 9. The rotary shaft 5 of a servomotor 1 is positioned substantially coaxially on the screw shaft 7.

A position detector 14 is engaged in the outer periphery of the rotary shaft 5 in the vicinity of the end thereof. Although the nut 13 is integrated with the pressure application shaft 9 in the first embodiment, it may be provided separately and may be integrated with the pressure application shaft 9 by welding or screwing at the end of the pressure application shaft 9.

The driving unit of a welding equipment of the first embodiment comprises, as set forth above, the servomotor 1, rotary shaft 5, screw shaft 7, male screw 8, nut 13 and pressure application shaft 9. In the driving unit of a welding equipment having such a construction, when a three-phase ac current is supplied to the winding 3 of the stator of the servomotor 1, in a state shown in FIG. 1, the rotor magnetic pole 4 is excited so that the rotary shaft 5 and screw shaft 7 are turned. As the screw shaft 7 is turned, the nut 13 meshing with the male screw 8 of the screw shaft 7 is advanced, so that the pressure application shaft 9 integrated with the nut 13 is also advanced. As a result, the movable arm, swingable arm, or work placing table, or the like performs pressure application operation by way of the trunnion shaft 10.

As mentioned in detail above, since the screw shaft 7 is integrated or substantially integrated with the rotary shaft 5 and the same bearing can be shared by the screw shaft 7 and the rotary shaft 5, the driving unit of a welding equipment can be reduced in length compared with the conventional driving unit of a welding equipment so that the length of the welding equipment is reduced to become compact. Further, since the moment of inertia applied to the servomotor 1 is reduced, moving response of the pressure application shaft 9 and the welding electrodes caused by the servomotor 1 is remarkably enhanced, realizing an efficient welding equipment that has an excellent operability.

As a baffling or stabilizing mechanism of the pressure application shaft 9, there is employed a known baffling mechanism such as a ball spline mechanism provided between the pressure application shaft 9 and the frame case 11, a mechanism using the bearing 12 and its rail.

Further, as shown in FIG. 1, if the machining part 51 on which the manually operating handle is mounted is formed on the end of the rotary shaft 5 opposite to the output side of the rotary shaft 5, the manually operating handle is mounted on the machining part 51 to turn the rotary shaft 5 manually to guide the pressure application shaft 9 to a desired position when the servomotor 1 is troubled.

Although in the first embodiment set forth above, a servomotor is employed as a motor, it is needless to say that a well-known motor such as a stepping motor, an inverter motor, a reluctance motor or the like may be properly employed as the motor.

Second Embodiment (FIG. 2):

A driving unit of a welding equipment according to a second embodiment is described next.

Figure 2:
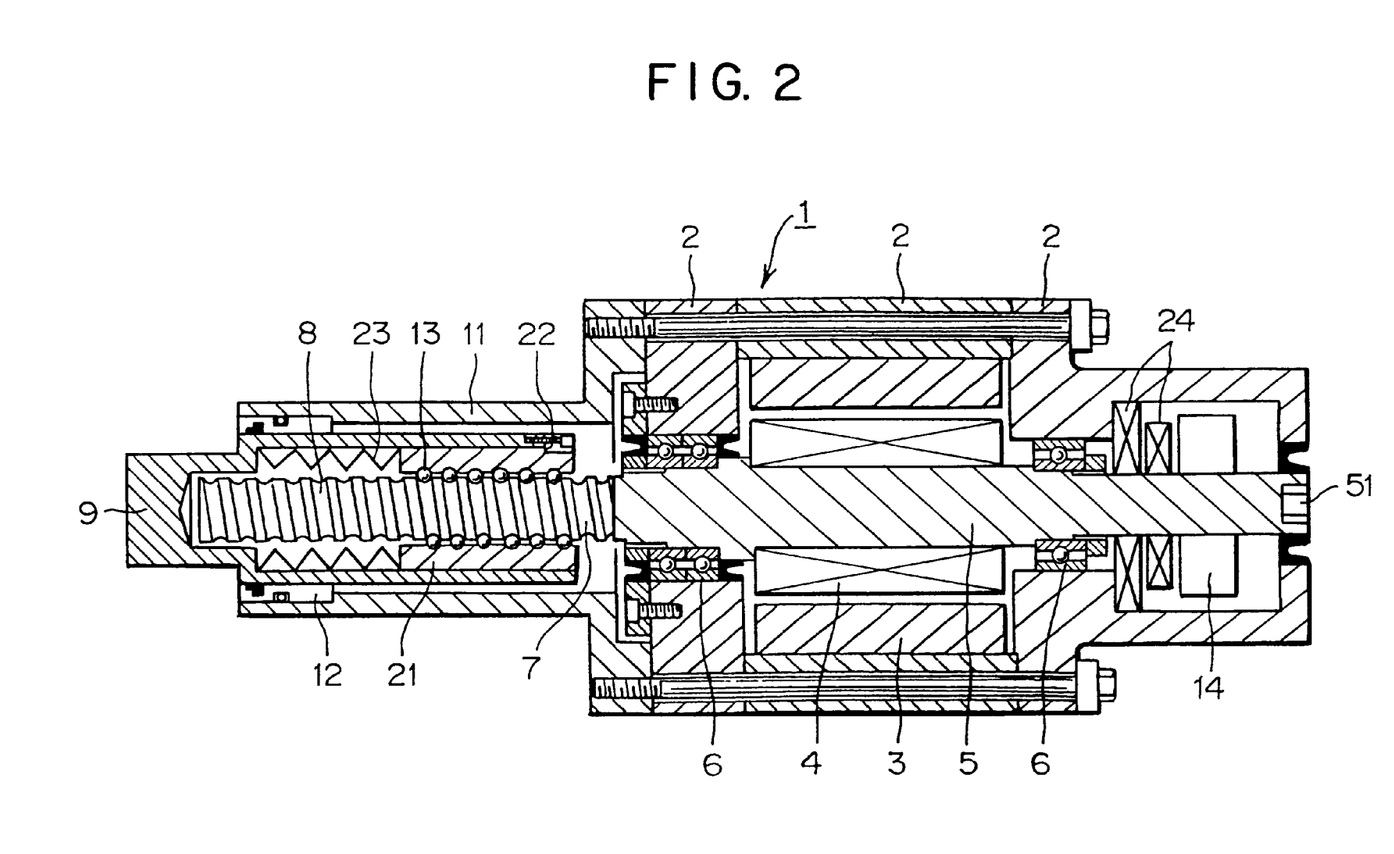
FIG. 2 is a sectional view of a driving unit of a welding equipment according to a second embodiment of the invention.

A ball nut 21 on which a female screw 13 is provided is slidably disposed relative to a pressure application shaft 9 wherein the ball nut 21 is integrally provided on the pressure application shaft 9 by way of a baffling member 22 so that the former is not turned relative to the latter. A conical spring 23 formed of an elastic body is disposed between the tip end of the ball nut 21 and the pressure application shaft 9. A position detector 14 and a electromagnetic brake 24 are disposed on a rotary shaft 5.

Other components of the driving unit of a welding equipment are substantially the same as those of the first embodiment, and hence they are depicted by the same reference numerals and the explanation thereof is omitted.

Although a screw shaft 7 is turned as a servomotor 1 turns, the ball nut 21 is advanced relative to the pressure application shaft 9 while it is slid by the female screw 13 meshing with a male screw 8 formed on the screw shaft 7 as the screw shaft 7 is turned so as to press the conical spring 23 while the conical spring 23 is bent. Since the conical spring 23 formed of the elastic body is disposed on the axis of the pressure application shaft 9 through which the pressure application force exerts, the pressing force toward the conical spring 23 becomes a strong pressing force relative to the pressure application shaft selection means 9, resulting applying an advancing force to the pressure application shaft 9. As a result, the tip end of the pressure application shaft 9 can press and fix a workpiece owing to the advancing force.

If the workpiece is pressed and fixed by the pressure application shaft 9, the servomotor 1 stops its turning but operates the electromagnetic brake 24 to restraining the rotary shaft 5 from being turned, thereby rendering the pressure application shaft selection means 9 to continuously press and fix the workpiece with certainty.

Third Embodiment (FIG. 3):

A driving unit of a welding equipment according to a third embodiment is described next.

Figure 3:
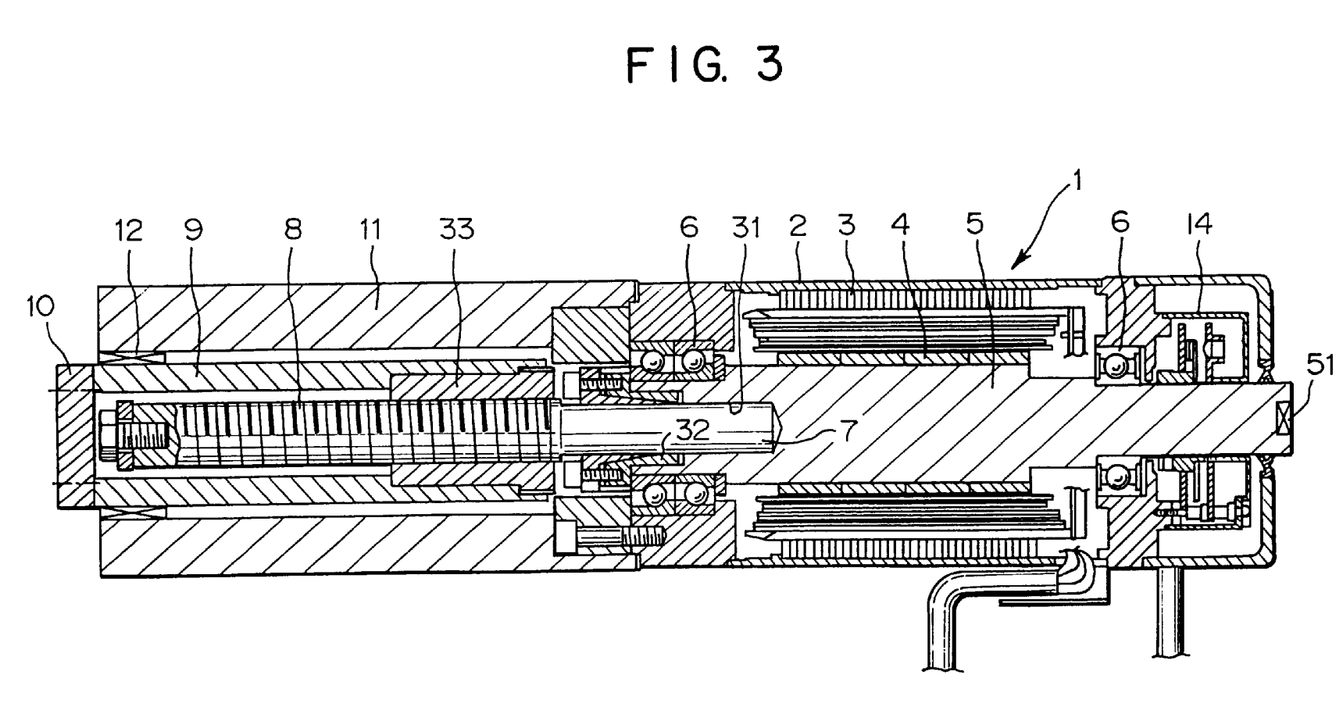
FIG. 3 is a sectional view of a driving unit of a welding equipment according to a third embodiment of the invention.

A hole 31 through which a screw shaft 7 is inserted is bored in a rotary shaft 5 of a servomotor 1. A power lock mechanism 32 formed by utilizing a wedging operation by an inner ring and an outer ring is disposed between the screw shaft 7 and the rotary shaft 5 so as to fix the rotary shaft 5 to the screw shaft 7. Accordingly, the screw shaft 7 and rotary shaft 5 are commonly journaled by common bearings 6. A nut 33 meshing with the male screw 8 formed on the screw shaft 7 is integrally fixed to the inner periphery of the pressure application shaft 9 at the end thereof.

Other components of the driving unit of a welding equipment are substantially the same of those of the first embodiment, and hence they are depicted by the same reference numerals and the explanation thereof is omitted.

In the third embodiment, the screw shaft 7 is turned as the servomotor 1 turns so that the nut 33 meshing with the male screw 8 formed on the screw shaft 7 is advanced as the screw shaft 7 is turned, whereby the pressure application shaft 9 is advanced.

As mentioned above, since the screw shaft 7 is substantially integrated with the rotary shaft 5 by a fixing unit utilizing a friction force and the bearing of the screw shaft 7 is shared with that of the rotary shaft 5 so that the length of the driving unit is reduced by the length of the shared bearing. As a result, the welding equipment is reduced in length and it becomes compact. Further, since the moment of inertia applied to the servomotor 1 becomes small, moving response of the pressure application shaft 9 and the welding electrodes caused by the servomotor 1 is remarkably enhanced, realizing a welding equipment that is operable and efficiently.

Further, since the rotary shaft 5 and ball screw shaft 7 are separately provided, the combination thereof can be freely selected to enhance flexibility, assembly and maintenance thereof, thereby forming the driving unit of a welding equipment so as to serve a motor-operated welding equipment that is compact and has an excellent operability.

Since the screw shaft 7 and the rotary shaft 5 are locked with each other by fastening means utilizing a friction force, the screw shaft 7 can be easily pulled out from the servomotor 1 by unlocking the fastening means.

The fastening means utilizing a friction force is not limited to that utilizing a wedging operation as set forth above, but includes an apparatus for generating pressure in liquid medium sealed in a sleeve and expanding the sleeve to perform fastening or the like.

Embodiment (FIG. 4):

A driving unit of a welding equipment according to a fourth embodiment is described next.

Figure 4:
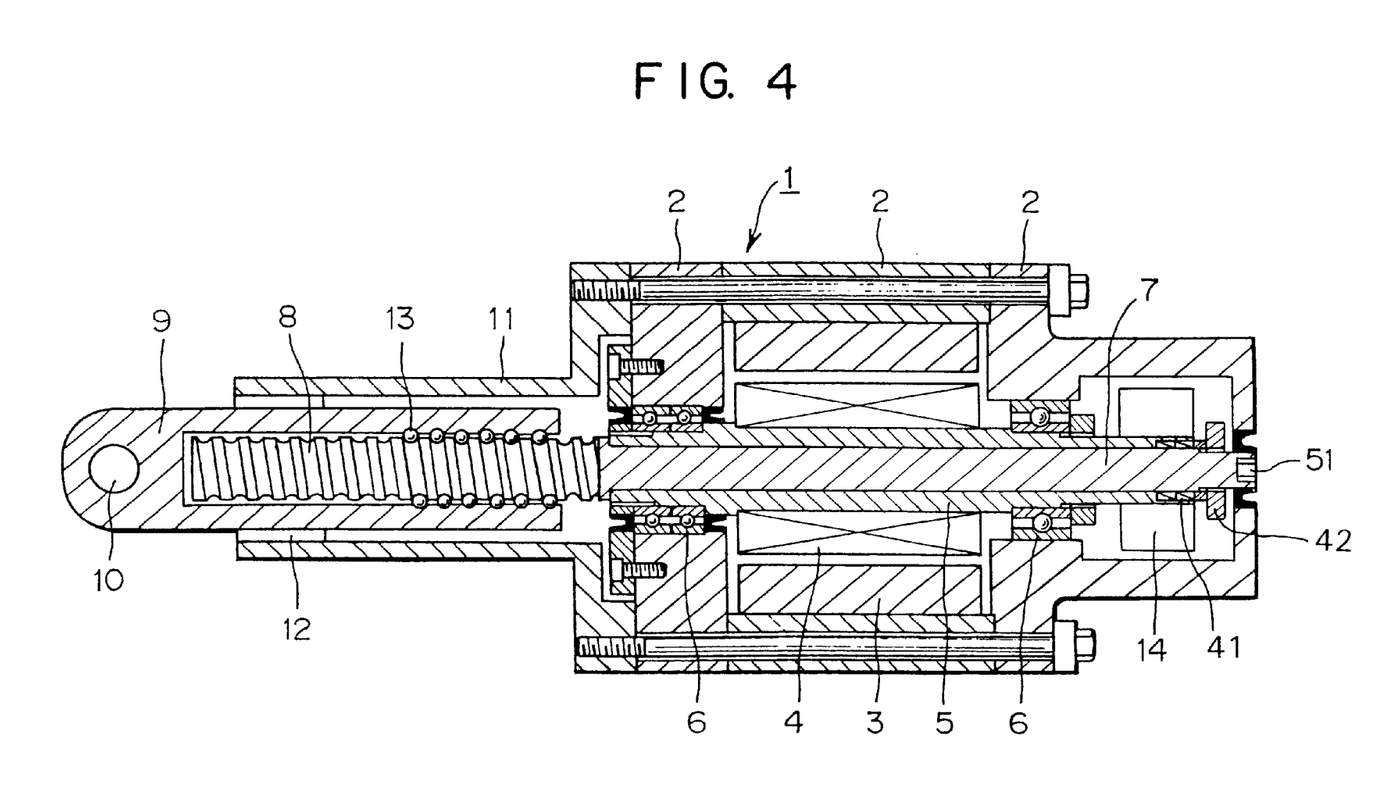
FIG. 4 is a sectional view of a driving unit of a welding equipment according to a fourth embodiment of the invention.

In FIG. 4, a rotary shaft 5 of a servomotor 1 is made hollow to form a hollow portion and it is journaled by bearings 6 and supported by an outer shell 2 of the servomotor 1. A ball screw shaft 7 is penetrated into the hollow portion of the rotary shaft 5. A ring 41 and a nut 42 are disposed on one end of the ball screw shaft 7 utilizing a friction force so as to fix the ball screw shaft 7 to the rotary shaft 5. Accordingly, the ball screw shaft 7 is journaled by the common bearings 6 that are shared by the rotary shaft 5. A ball screw 8 is screwed on the other end of the ball screw shaft 7 and is disposed outside the servomotor 1.

A pressure application shaft 9 is journaled by a bearing 12 inside a housing so as to be reciprocated but not turned, while a ball nut 13 meshing with the ball screw 8 is substantially integrally provided with the rear end of the pressure application shaft 9.

Other components of the driving unit of a welding equipment are substantially the same as those of the first embodiment, and hence they are depicted by the same reference numerals and the explanation thereof is omitted.

Also in this embodiment, when the ball screw shaft 7 substantially integrated with the rotary shaft 5 is turned, the ball nut 13 meshing with the male screw 8 of the ball screw shaft 7 is advanced, so that the pressure application shaft 9 integrated with the ball nut 13 is also advanced. As a result, a movable arm, a swingable arm, or a work placing table, or the like performs pressure application operation by way of a trunnion shaft 10.

As mentioned in detail above, since the ball screw shaft 7 is substantially integrated with the rotary shaft 5 and is positioned inside the servomotor 1, and also the bearing of the ball screw shaft 7 is shared by the rotary shaft 5 so that the driving unit of a welding equipment can be reduced by the length of the shared bearing compared with the conventional driving unit of a welding equipment so that the welding equipment is reduced in length and becomes compact. Further, since the moment of inertia applied to the servomotor 1 is reduced, moving response of the pressure application shaft 9 and the welding electrodes caused by the servomotor 1 is remarkably enhanced. Still further, since the rotary shaft 5 and ball screw shaft 7 are separately provided, the combination thereof can be freely selected to enhance flexibility, assembly and maintenance thereof, thereby forming the driving unit of a welding equipment so as to serve a motor-operated welding equipment that is compact and has excellent operability.

Further, since the ball screw shaft 7 and rotary shaft 5 are locked with each other by fastening means utilizing a friction force such as a wedging operation, they can be fixed to each other without requiring a troublesome operation such as shrinkage fit or cold shrinkage fit. It is possible to easily pull out the ball screw shaft 7 from the servomotor 1 by unlocking the ball screw shaft 7 from the rotary shaft 5. Further, since a machining part 51 is provided on one end of the ball screw shaft 7 on which a manually operating handle is mounted, the ball screw shaft 7 is turned manually by mounting the manually operating handle (not shown) on the machining part 51 when the servomotor 1 is troubled so as to advance the pressure application shaft 9 so that a movable arm or a swingable arm can be guided to a desired opening position.

Fifth Embodiment (FIG. 5):

A driving unit of a welding equipment according to a fifth embodiment is described next.

Figure 5:
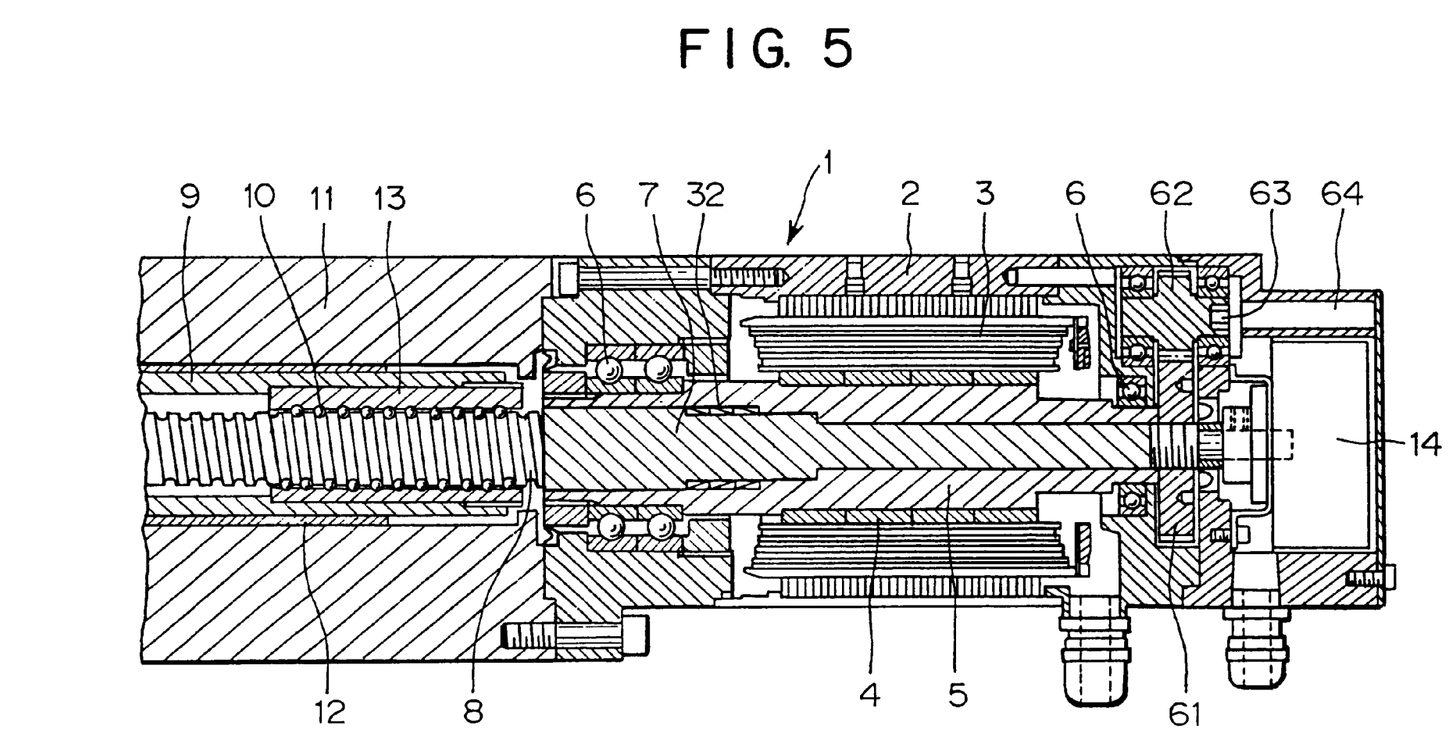
FIG. 5 is sectional view of a driving unit of a welding equipment according to a fifth embodiment of the invention, particularly a view showing the detail of a machining part thereof on which a manually operating handle is mounted for manually operating the driving unit.

In FIG. 5, a rotary shaft 5 of the servomotor 1 is formed of a hollow shaft and is supported by the outer shell 2 of the servomotor 1 by way of bearings 6. Further, a ball screw shaft 7 is positioned in the core of the axis of the servomotor 1 and is fixed to the rotary shaft 5 by a power lock mechanism 32. A screw 8 of the ball screw shaft 7 is screwed with a ball nut 13 provided on the pressure application shaft 9 so that a rotary force of the rotary shaft 5 of the servomotor 1 is converted into a reciprocating motion so as to reciprocate the pressure application shaft 9. This construction is substantially the same as the fourth embodiment, and hence other components are depicted by the same reference numerals and the detail of the construction is omitted.

The ball screw shaft 7 positioned in the core of the axis of the servomotor 1 and fixed to the rotary shaft 5 by the power lock mechanism 32 is extended rearward from the body of the servomotor 1 and is connected to a position detector 14.

Although the manually operating part 51 is disposed at the rear of the position detector 14 in the fourth embodiment, the manually operating part is however positioned as follows in the fifth embodiment.

That is, a relatively large diameter gear 61 forming a driven part for transmitting the force (or torque) of the servomotor 1, is fixed to the ball screw shaft 7 between the front of the position detector 14 and the rear of the body of the servomotor 1. A relatively small diameter gear 62 forming a manually operating driving part for applying a turning torque to the gear 61 of the driven part is positioned eccentrically from the rotary central axis of the servomotor 1, and the gears 61 and 62 mesh directly with each other. The gears 61 and 62 may be connected with each other by way of a serrated toothed belt (not shown).

A machining part 63 comprising, e.g., a manual turning unit, such as a machining hole or machining projection, is formed on the gear 62 of the driving part so that the gear 62 is operated by a handle or the like by way of a manual operating hole 64.

When the pressure application shaft 9 can not perform a reciprocating motion owing to a trouble in the servomotor 1 or an operation system of the welding equipment, a manually operating handle (not shown) is mounted on the machining part 63 formed on the gear 62 of the driving part so that the ball screw shaft 7 is turned by way of the gears 61, 62 by turning the handle. As a result, the pressure application shaft 9 performs a reciprocating motion so that the pressure application shaft 9 is moved to a desired standby position Meanwhile, since electronic components or the like are generally disposed on the entire back surface of the position detector 14 that is positioned coaxially with the servomotor 1, the ball screw shaft 7 hardly penetrates the position detector 14. However, according to the invention, while the ball screw shaft 7 does not penetrate the position detector 14, the gear 61 of the driven part for transmitting the of the servomotor 1 is formed on the rotary central axis of the servomotor 1 between the front of the position detector 14 and the rear of the body of the servomotor 1 and the gear 63 for applying a turning torque to the gear 61 is positioned eccentrically from the rotary central axis of the servomotor 1. As a result, the gear 62 for applying a turning torque to the gear 61 is easily provided to render the driving unit of a welding equipment compact as a whole.

Although the gear 61 of the driven part is formed on the ball screw shaft 7 for transmitting the torque of the servomotor 1, the gear 61 of the driven part for driving the torque may be provided instead of the ball screw shaft 7 in the case that the rotary shaft 5 is extended rearward the body of the servomotor 1 as illustrated in the first to third embodiments.

Sixth Embodiment (FIG. 6):

A driving unit of a welding equipment according to a sixth embodiment is described next.

Figure 6:
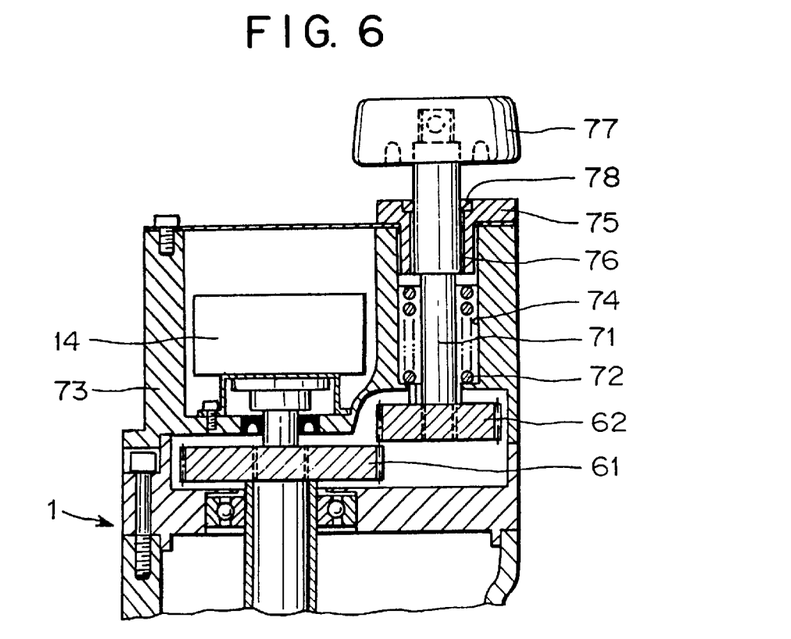
FIG. 6 is sectional view of a driving unit of a welding equipment according to a sixth embodiment of the invention, particularly a view showing the detail of a machining part thereof on which a manually operating handle is mounted for manually operating the driving unit.

A gear 62 of a driving part for driving a gear 61 forming a driven part for transmitting the torque of a servomotor 1 is made standby when the servomotor 1 operates. That is, a returning spring 72 formed of an elastic body is biased in guide shaft 71 for holding the gear 62 to form a standby unit. The guide shaft 71 is formed in a housing 73 of a position detector 14 and is journaled by a bearing 76 of a bearing holding member 75 screwed in the entrance of the hole 74. A manual operating knob 77 and a dust seal 78 are also provided.

In the sixth embodiment, the gear 62 is normally forced to standby upward by the returning spring 72 serving as a standby unit, and hence it does not mesh with the gear 61 so that the gear 62 is not turned when the motor operates.

When a pressure application shaft 9 can not perform the reciprocating motion, the manually operating knob 77 is first pressed against the urging force of the returning spring 72 so that the gear 62 meshes with the gear 61. At this time, when the manually operating knob 77 is turned to turn the gear 62, a ball screw shaft 7 or rotary shaft 5 is turned by way of the gears 62, 61 so that the pressure application shaft 9 performs a reciprocating motion, and hence the pressure application shaft 9 is moved to a desired standby position.

As mentioned above, since the gear 62 is not turned when the motor operates normally, wasting energy consumption can be reduced.

Seventh Embodiment (FIG. 7):

A driving unit of a welding equipment according to a seventh embodiment is described next.

Figure 7:
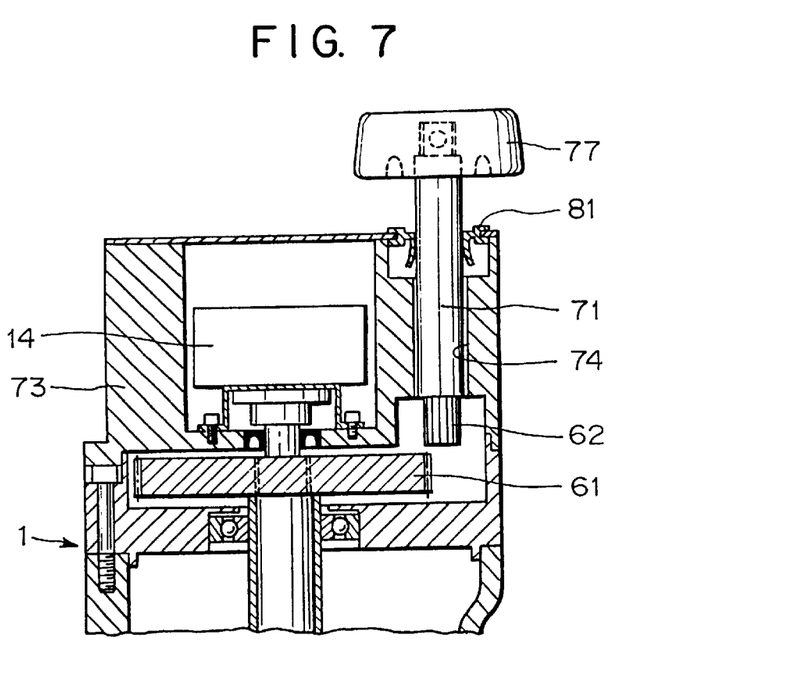
FIG. 7 is sectional view of a driving unit of a welding equipment according to a seventh embodiment of the invention, particularly a view showing the detail of a machining part thereof on which a manually operating handle is mounted for manually operating the driving unit.

In the seventh embodiment shown in FIG. 7, a gear 62 of a driving part for driving a gear 61 of a driven part for transmitting the torque of a servomotor 1 is pulled off from a housing 73 of a position detector 14 when the servomotor 1 operates. That is, the diameter of a guide shaft 71 is slightly made larger than that of the gear 62 and the diameter of a hole 74 is formed in the manner that the guide shaft 71 can pass through the hole 74 together with the gear 62. A notched cover 81 formed of rubber is positioned at the entrance of the hole 74 for closing the entrance of the hole 74 so that a foreign matter such as dust is prevented form entering the hole 74 when the gear 62 is removed from the motor 1.

In this seventh embodiment, the gear 62 in normally taken out from the motor 1 by a manually operating knob 77 so that the gears 61 and 62 do not mesh with each other, and hence the gear 61 merely runs idle when the motor 1 operates.

As mentioned above, when the pressure application shaft 9 can not perform the reciprocating motion, the gear 62 is first inserted into the hole 74 using the manually operating knob 77 to permit the gear 62 to mesh with the gear 61. Then, when the gear 62 is turned by turning the manually operating knob 77, the ball screw shaft 7 or the rotary shaft 5 is turned by way of the gears 61 and 62 to permit the pressure application shaft 9 to perform the reciprocating motion so that the pressure application shaft 9 can be moved to a desired standby position.

Also in the seventh embodiment, since the gear 61 merely runs idle when the motor normally operates, wasting energy consumption is reduced.

Since the driving unit of a welding equipment comprises a screw shaft provided integrally with or substantially with a rotary shaft of the motor, a nut provided integrally with or substantially integrally with the pressure application shaft and is screwed with a screw of the screw shaft, and a baffling mechanism provided on the pressure application shaft, wherein the rotary shaft of the motor is positioned substantially coaxially with the screw shaft and a rotary force outputted from the rotary shaft of the motor is converted into a reciprocating motion of the pressure application shaft, it is possible to provide the driving unit of a welding equipment capable of reducing the size of the driving unit, of reducing the moment of inertia, and of being compact and having an excellent operability.

Further, since the screw shaft is substantially integrally provided on the rotary shaft of the motor by fixing the former to the latter utilizing a friction force, it is possible to provide the driving unit of a welding equipment capable of fixing both the screw shaft and the rotary shaft to each other without requiring a troublesome operation such as shrinkage fit or cold shrinkage fit.

Still further, since the elastic body is disposed on the axis of the pressure application shaft through which the pressure application force exerts, and the electromagnetic brake is disposed on the rotary shaft of the motor, it is possible to provide the driving unit of a welding equipment capable of securing the application of pressure to a workpiece by a pressure application shaft.

On a screw shaft opposite to the output side of the rotary shaft, on which a manually operating handle is mounted, it is possible to provide the driving unit of a welding equipment capable of moving a pressure application shaft to a desired standby position when a motor is troubled.

What is claimed is:

1. A driving unit of a welding equipment provided with a force application shaft that is driven by a motor, comprising:
   a screw shaft coaxially fixed with a rotary shaft of the motor;
   a nut fixed with the force application shaft and threadably engaged with a screw of the screw shaft;
   a stabilizing mechanism engaging the force application shaft to prevent rotation thereof;
   an elastic body disposed on the axis of the force application shaft through which the force exerts; and
   an electromagnetic brake disposed on the rotary shaft of the motor,
   whereby a rotary force output from the rotary shaft of the motor is converted into a reciprocating motion of the force application shaft which in turn applies a force to the welding equipment.

2. A driving unit of a welding equipment provided with a force application shaft that is driven by a motor, comprising:
   a screw shaft coaxially fixed with a rotary shaft of the motor;
   a nut fixed with the force application shaft and threadably engaged with a screw of the screw shaft;
   a stabilizing mechanism engaging the force application shaft to prevent rotation thereof;
   whereby a rotary force output from the rotary shaft of the motor is converted into a reciprocating motion of the force application shaft which in turn applies a force to the welding equipment; and
   wherein the screw shaft is integrally provided on the rotary shaft of the motor by boring a closed bore hole at an output side of the rotary shaft of the motor, and inserting one end of the screw shaft into the closed bore hole.

3. A driving unit of a welding equipment provided with a force application shaft that is driven by a motor, comprising:
- a screw shaft coaxially fixed with a rotary shaft of the motor;
- a nut fixed with the force application shaft and threadably engaged with a screw of the screw shaft, an outer diameter of the nut being the same as or smaller than an outer diameter of the force application shaft;
- a stabilizing mechanism engaging the force application shaft to prevent rotation thereof;
- whereby a rotary force output from the rotary shaft of the motor is converted into a reciprocating motion of the force application shaft which in turn applies a force to the welding equipment, and
- wherein the screw shaft is integrally provided on the rotary shaft by rendering the rotary shaft of the motor hollow to form a hollow portion and having the screw shaft penetrate the hollow portion to fix the screw shaft to the hollow portion.

4. A driving unit of a welding equipment provided with a force application shaft that is driven by a motor, comprising:
- a screw shaft coaxially fixed with a rotary shaft of the motor, the screw shaft being integrally provided on the rotary shaft by fixing the screw shaft to the rotary shaft utilizing a friction force;
- a nut fixed with the force application shaft and threadably engaged with a screw of the screw shaft; and
- a stabilizing mechanism engaging the force application shaft to prevent rotation thereof,
- wherein a rotary force output from the rotary shaft of the motor is converted into a reciprocating motion of the force application shaft which in turn applies a force to the welding equipment.

5. A driving unit of a welding equipment provided with a force application shaft that is driven by a motor, comprising:
- a screw shaft coaxially fixed with a rotary shaft of the motor;
- a nut fixed with the force application shaft and threadably engaged with a screw of the screw shaft;
- a stabilizing mechanism engaging the force application shaft to prevent rotation thereof;
- a driven part provided on the rotary shaft of the motor or the screw shaft and positioned between the rear of a body of the motor and the front of a position detector for transmitting torque of the motor; and
- a manual operating driving part positioned eccentrically from the screw shaft for transmitting a turning torque to the driven part,
- wherein a rotary force output from the rotary shaft of the motor is converted into a reciprocating motion of the force application shaft which in turn applies a force to the welding equipment.

6. The driving unit of a welding equipment according to claim 5, wherein the driven part is formed of a gear, and further comprising a machining part that is manually operable and is formed in a gear of the driving part connected to the gear of the driven part directly or by way of a serrated toothed belt.

7. The driving unit of a welding equipment according to claim 5, wherein the driven part is formed of a gear, the driving part meshing with the gear of the driven part is formed of a gear, and further comprising a standby unit formed of an elastic body for displacing the position of the gear of the driving part, wherein the gear of the driving part is rendered standby when the motor is operated by the standby unit.

8. The driving unit of a welding equipment according to claim 5, wherein the driven part is formed of a gear, the driving part meshing with the gear of the driven part is formed of a gear, and further comprising a guide shaft integrally provided with the gear of the driving part, wherein the gear of the driving can be taken out from the motor by the guide shaft when the motor operates.

9. A driving unit of a welding equipment provided with a force application shaft that is driven by a motor having a rotary shaft, comprising:
- a screw shaft fixed to and coaxially aligned with the rotary shaft of the motor for rotation therewith, the screw shaft having an externally threaded screw portion at the output end thereof;
- the force application shaft being coaxially aligned with the screw shaft, engaged with the threaded screw portion of the screw shaft;
- a stabilizing mechanism engaging the force application shaft to prevent rotation thereof;
- a nut coaxially aligned with the force application shaft, the nut being nonrotatably but axially slidably supported on the force application shaft, the nut having an inner thread opening which is threadably engaged with the screw shaft; and
- a spring coacting axially between the nut and the force application shaft for applying a biasing force to the force application shaft in response to movement of the nut;
- whereby a rotary force output from the rotary shaft of the motor is converted into linear movement of the nut.

* * * * *